T. G. HITT.
ELECTROLYTIC CELL.
APPLICATION FILED OCT. 26, 1917.
1,256,319. Patented Feb. 12, 1918.
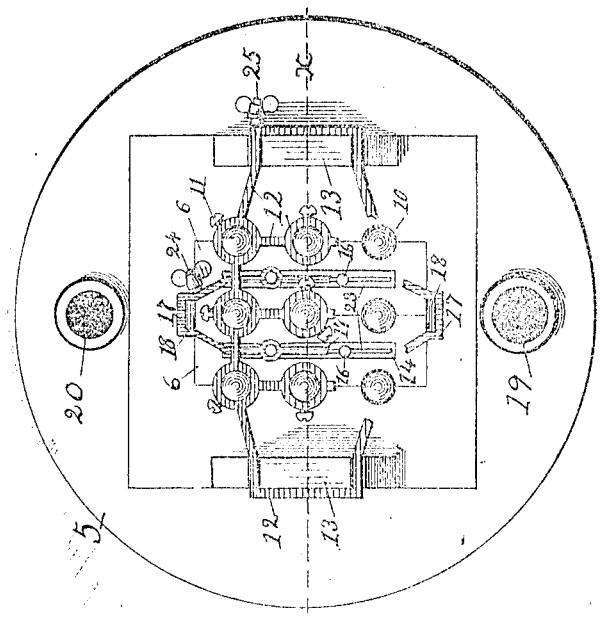
Fig. I.
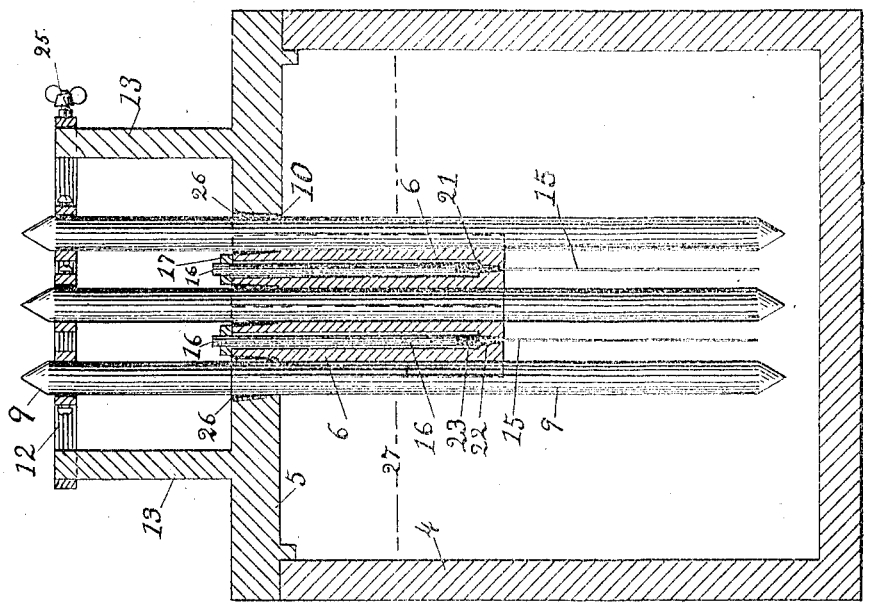
Fig. II.
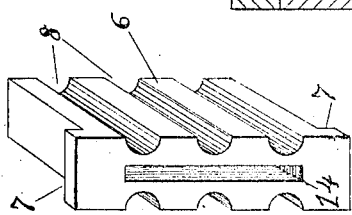
Fig. III.
Inventor
Thomas G. Hitt.
By W. X. Stevens.
Attorney

UNITED STATES PATENT OFFICE.

THOMAS G. HITT, OF SEATTLE, WASHINGTON.

ELECTROLYTIC CELL.

1,256,319.   Specification of Letters Patent.   Patented Feb. 12, 1918.

Application filed October 26, 1917. Serial No. 198,707.

*To all whom it may concern:*

Be it known that I, THOMAS G. HITT, a citizen of the United States, residing at Seattle, in the county of King and State of Washington, have invented certain new and useful Improvements in Electrolytic Cells, of which the following is a specification.

This invention relates to electrolytic cells. My present use for the cell is to transform chlorids into perchlorates. For this purpose, platinum is the most effective material, within my knowledge, to serve as the anode, and platinum is, at present, so expensive that I have devised means to economize in its use.

To this end my invention consists in the construction and combination of parts forming an electrolytic cell hereinafter more fully described and particularly stated in the claims, reference being had to the accompanying drawings, in which;

Figure I, is a top view of an electrolytic cell according to my invention, certain parts being broken away.

Fig. II, is a vertical section at line *x*, Fig. I.

Fig. III, is a perspective view of one of the protecting boxes lying on one side.

Numeral 4 represents the body of the cell, usually made of glazed earthern ware that is sometimes called porcelain, for containing the electrolyte. Through the lid 5, two boxes 6, are suspended by their flanges 7, and have vertical, half-round grooves 8, in their faces which, registering together, form passages for carbon cathodes 9, to hang in. At the extreme outer faces of the boxes 6, half round grooves 10, in the lid, register with the adjacent half rounds in the boxes. Each carbon is fastened by a binding screw 11, to a grill 12, which supports all the carbons, the grill being mounted on two posts 13, of the lid 5. Each box 6, has a slot 14, extending vertically through it, and through this slot a very thin sheet of platinum 15, passes and is suspended by means of hanger rods 16, which are preferably heavy copper wire suspended from a grill 17, that rests on the boxes 6, and lid 5, and is kept in position by bosses 18, on the lid.

Through an inlet 19, the solution that is to be treated may be poured; and at an opening 20, a pipe, preferably flexible, may be connected to dispose of gas fumes that are generated in operation. Below the shoulder 21, on which the rods 16, rest, the slot in each box 6, is reduced in thickness, and after the platinum is located in it, this portion 22, of the slot is to be closely calked with some kind of material—preferably cement made of rubber and granulated asbestos—that will resist the action of chloric acid and other byproducts of electrolysis. With this protection, a copper crossbar 23, and copper rods or wires 16, may be used to support the sheet of platinum 15, and common solder used to firmly secure them together. Wires communicating with some source of electricity may be attached to the positive grill 17, by a bindingscrew 24, and to the negative grill 12, by a bindingscrew 25. The spaces 26, around the carbons, and any other cracks where gas might leak out should be securely calked. Platinum is the only material at present used as anodes in the electrolytic process of producing perchlorates, and, as a wire must be very heavy to support the platinum in the electrolyte and convey the amperage of electricity due for this purpose, I have devised this means of protecting connections of cheaper material that would otherwise be quickly destroyed if exposed to the electrolyte or the fumes generated in service.

In this cell the electrolyte may rise, as high as the broken line 27, or even higher above the level of the wire connections at 23, as the boxes 6, and the packing 22, hermetically seal those connections from electrolytic action, or action from the fumes thereof.

This cell is not necessarily confined to the production of perchlorates but may be adapted for other electrolytic purposes.

I claim;

1. In an electrolytic cell, a receptacle for an electrolyte and a cover therefor; carbons depending through the cover; a box depending below the cover and having a slot vertically through it; a sheet of anode material depending below the box; wires communicating between a source of electricity and the carbons, and the anode material; the connection of the anode material and wire being within the said box and sealed against electrolytic action.

2. In an electrolytic cell, a receptacle for an electrolyte; a lid for the receptacle; boxes depending side by side through the lid and having vertical grooves registering together in their adjacent faces; grooves in the lid registering with grooves in the box faces adjacent thereto; carbons depending through the apertures formed by the said grooves; a slot vertically through each box; anode material in the slot and extending into the electrolyte receptacle; wires communicating between the carbons, a source of electricity, and the anodes; the connections with the anodes being within the said boxes, and the boxes being sealed to protect the connections from electrolytic action.

In testimony whereof I affix my signature in presence of two witnesses.

THOMAS G. HITT.

Witnesses:
M. M. PIXLEY,
C. M. MARTIN.